Dec. 2, 1924.                                          1,517,732
O. W. JOHNSON
ATTACHMENT FOR TRACTORS
Filed April 28, 1921          2 Sheets-Sheet 2
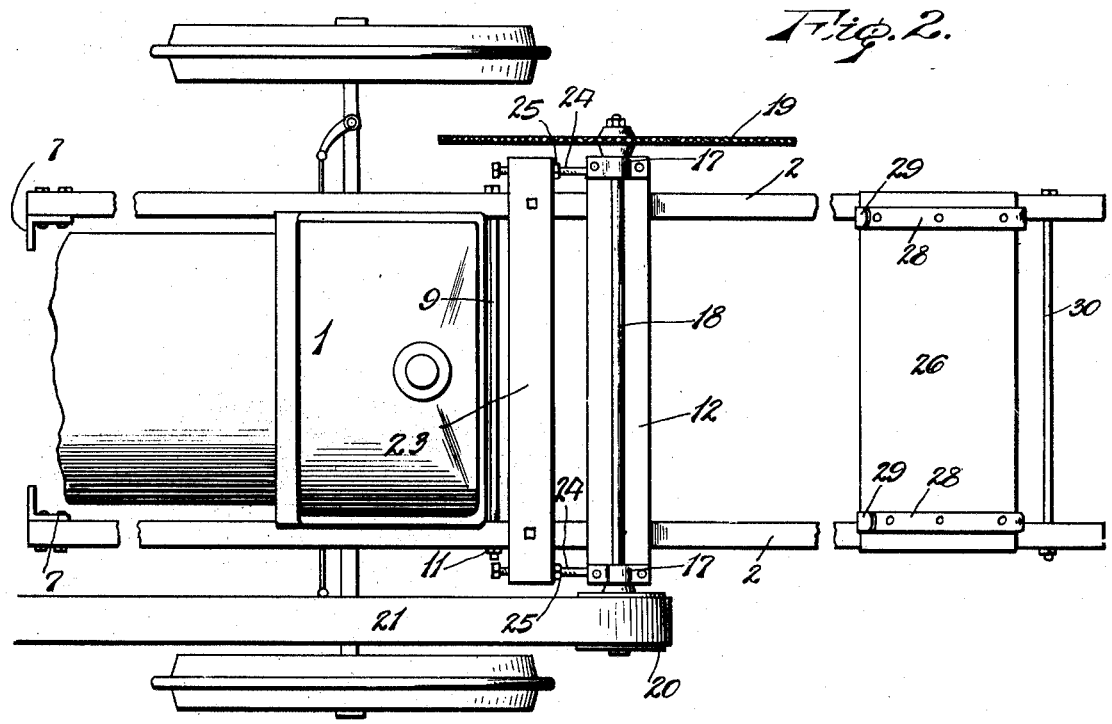
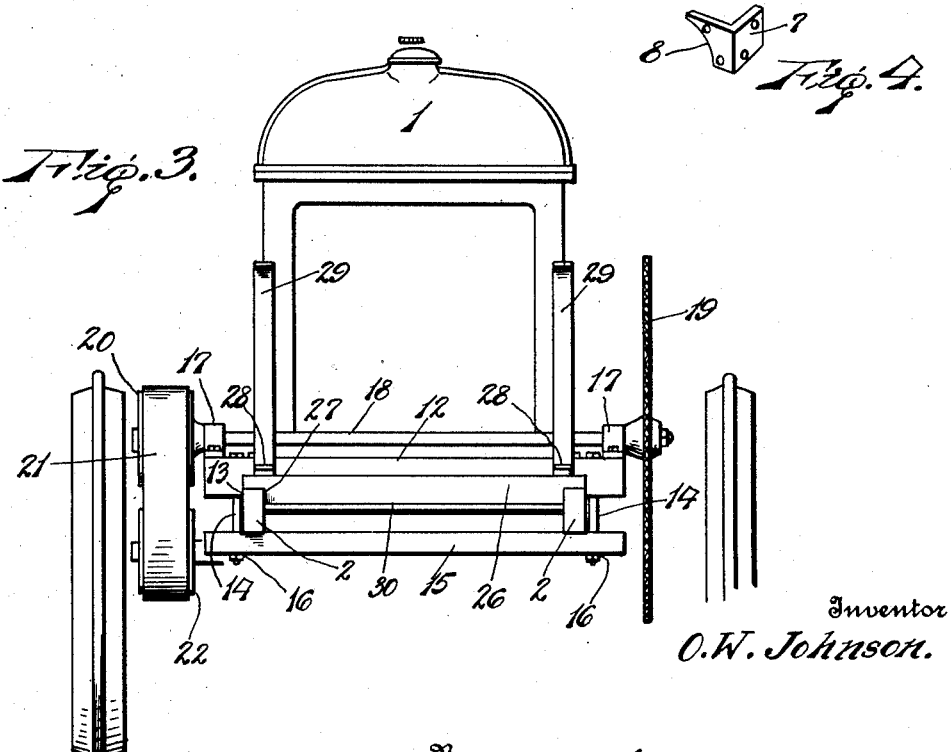
Inventor
O. W. Johnson.
By
Lacey & Lacey, Attorneys Patented Dec. 2, 1924.

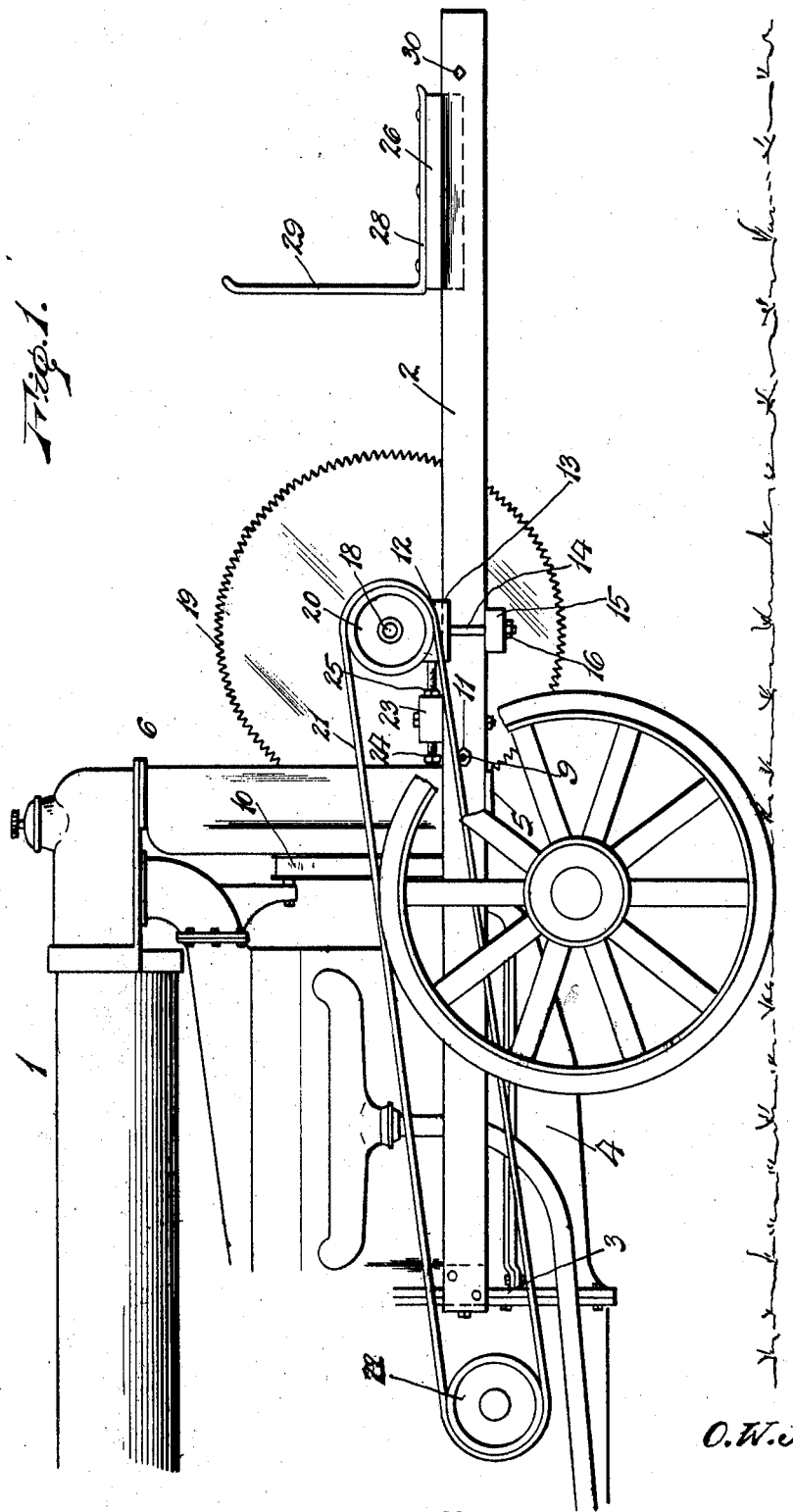

1,517,732

UNITED STATES PATENT OFFICE.

OLIVER W. JOHNSON, OF GENEVA, OHIO.

ATTACHMENT FOR TRACTORS.

Application filed April 28, 1921. Serial No. 465,342.

*To all whom it may concern:*

Be it known that I, OLIVER W. JOHNSON, a citizen of the United States, residing at Geneva, in the county of Ashtabula and State of Ohio, have invented certain new and useful Improvements in Attachments for Tractors, of which the following is a specification.

This invention is an attachment for tractors having for its object the provision of a strong, simple, inexpensive and durable device whereby various machinery may be supported so as to be carried from point to point by the tractor and operated directly from the tractor at the point of use.

In the accompanying drawings, I have illustrated the invention adapted for supporting and driving a saw but it is to be understood that it may be used for supporting and operating other machinery such as sprayers, fodder cutters, grinders, and other small machinery and tools employed upon farms. The invention consists in certain novel features which will be hereinafter first fully described and then particularly pointed out in the appended claims.

In the accompanying drawings—

Figure 1 is a side elevation of my apparatus showing it in position upon a tractor and showing so much of the tractor as is necessary to give an adequate understanding of the invention;

Fig. 2 is a plan view of the same;

Fig. 3 is a front end elevation;

Fig. 4 is a detail perspective view of a bracket which is employed.

The tractor 1 is illustrated in a conventional manner only and for the purposes of illustration I have chosen a well-known form of tractor which is very generally used by farmers and in which the driving and steering wheels are attached directly to the engine and the transmission case without the use of a chassis. In carrying out my invention, I employ a pair of side bars 2 which are shown as wooden beams but may obviously be metal bars or sills. These side bars are of such length that they will project forwardly from the flange 3 of the gear case 4 of the tractor and rest upon the flanges 5 at the bottom of the radiator 6. The extent to which the side bars may project forwardly beyond the radiator is, of course, to be determined by the preferences of the user. At the rear end of each sill, I secure a right angular bracket 7 which projects inwardly from the bar, as shown most clearly in Fig. 2, and is adapted to engage behind the flanges 3, as shown clearly in Fig. 1, and be secured to the same by the bolts now employed to connect the said flanges in the tractor. The inner edge of the inwardly projecting portion of the bracket 7 is concave, as shown at 8, in order that it may fit closely to the opposed surface of the tractor and forward movement of the sills is thereby effectually prevented. Immediately in front of the radiator, a tie bolt 9 is inserted through the sills and serves to clamp the same firmly against the sides of the radiator and prevent spreading of the bars. It may be desirable, when a governor is used to vary the shape of these sills slightly so as to avoid conflict with the governor belt of the tractor, indicated at 10, and it is to be understood that such minor variations involve no departure from the invention. In applying the supporting frame to the tractor, the retaining nut 11 upon the tie bolt 9 is loosened so that the bars may be spread apart sufficiently to clear the radiator and the hood, after which the bars are moved vertically downward into engagement with the flanges 5 and the nut 11 is turned home. The brackets 7 will be in this manner brought into position behind the flanges 3 and may be readily secured thereto.

In the illustrated embodiment of the invention, a cross bar 12 is placed upon the sills 2 in advance of the tie bolt 9 and this cross bar is provided in its under side adjacent its ends with grooves, indicated at 13, which engage the upper edges of the sills and aid in preventing spreading of the sills and transverse dislodgment of the cross bar. The ends of the cross bar project beyond the sills, as clearly shown, and through the said projecting ends clamping bolts 14 are inserted, said bolts passing through a clamping bar 15 which is disposed against the under sides of the bars 2, as illustrated, and nuts 16 upon the bolts 14 being turned home against the clamping bar 15 so that the cross bar 12 will be securely fastened in place. The cross bar 12 carries bearings 17 upon its upper side and a shaft 18 is journaled in the said bearings. Upon one end of this shaft is secured a circular saw 19, while upon the opposite end thereof is secured a pulley 20, a belt 21 being trained around the said pulley 20 and the pulley 22 which is mounted upon the side of the tractor and operatively connected with the engine of the same so as to be driven by said engine when the tractor is at rest. Between the shaft-carrying cross bar 12 and the radiator of the tractor, I secure upon the sills 2 an anchor bar 23 which is firmly clamped to the sills and has its ends projecting beyond the same, as clearly shown in Fig. 2. Through the projecting ends of the anchor bar 23, I mount long screws or bolts 24 which have their forward ends engaged in sockets provided therefor in the rear side of the bar 12 and lock nuts 25 are mounted upon the said bolts or screws to bear against the front side of the said anchor bar. It will be readily understood that by adjusting the screws or bolts 24, while the bolts 14 are somewhat loosened the cross bar 12 may be shifted toward the front ends of the sills and the belt 21 thereby put under the desired tension so that the proper operative connection between the pulleys 20 and 22 will be established. After the belt 21 has been properly tightened, the lock nuts 25 are turned home and the nuts 16 then again tightened so that the saw shaft will be firmly supported.

This construction and arrangement of elements also enables me to maintain the saw in parallelism with the adjacent sill so that contact of the saw with the sill and resulting damage to both is avoided.

In advance of the saw, I slidably mount upon the sills 2 a platform or rest 26 which may conveniently be a flat board having its ends rabbeted, as shown at 27, so as to engage the inner sides and upper edges of the sills and thereby be held against displacement. Upon the upper side of the rest, adjacent the ends of the same, I secure guards each consisting of a base member 28 secured to the rest and an upstanding member or arm 29. When wood is to be sawed, the limbs or long pieces are placed upon the rest 26 against the upstanding arms 29 and the rest is then pushed rearwardly over the sills so that the wood thereon will be brought against the saw.

To prevent spreading of the front ends of the sills, a tie bolt 30 is inserted through them in advance of the rest or work holder 26, as shown and as will be readily understood.

The manner of driving the saw so as to cut through the wood is thought to be obvious from the foregoing description, taken in connection with the accompanying drawings. It will be readily noted that I have provided a very simple, inexpensive and strong supporting frame which may be readily attached to and detached from the tractor and utilized to carry various forms of machinery. The apparatus will be found particularly desirable in reducing to short lengths the limbs of trees which have been broken off by storms or removed in the operation of pruning. Under the prevailing custom, these limbs and other pieces of wood in orchards or upon farms are gathered into one large pile and a wood-sawing machine is set up adjacent the said pile of wood and operated at a fixed point, the wood being brought from the pile to the sawing machine by attendants. It is frequently necessary to readjust the machine and move it up to the pile as the wood sawing progresses, but with the use of my apparatus the time consumed in bringing the several pieces of wood singly to the saw and readjusting the sawing machine as the work progresses is saved inasmuch as the tractor is driven under its own power to the gathered wood and is then driven forward as the pile of wood decreases. A similar saving of time is effected in all uses to which the apparatus may be put and it will be noted that no change in the construction of the tractor or the arrangement of any of its parts is needed to permit the attachment of my apparatus thereto.

Having thus described the invention, what is claimed as new is:

1. In combination with a self propelled tractor of the unitary type including a radiator, propulsion wheels, and a transverse work shaft operable independently of said wheels, a pair of sills disposed at the sides of the main body of the tractor and rigidly secured at their rear ends to said body and having their intermediate portions carried by the lower end of the radiator, means in advance of the radiator for clamping said sills against the sides of the radiator and preventing spreading of the sills, work-performing mechanism mounted on the sills in advance of the radiator, and means for operating the work-performing mechanism from the said work shaft of the tractor.

2. An attachment for unitary type self-propelled tractors comprising a pair of sills adapted to be disposed at the sides of the tractor, means for securing the rear ends of said sills to the tractor body, means in advance of the tractor for clamping the sills to the tractor radiator and also preventing spreading of the sills, means for supporting work upon the sills in advance of the tractor, work-performing mechanism mounted on the sills in rear of the work-supporting means and in advance of the sill-clamping means, and means for driving said work-performing means from the tractor independently of the propulsion wheels.

3. An attachment for unitary type self-propelled tractors comprising a pair of sills adapted to rest upon the lower flanges of the tractor radiator, brackets at the rear ends of said sills to be secured to the gear casing of the tractor, a tie bolt inserted transversely through and connecting said sills in advance of the tractor whereby to clamp the sills to the tractor radiator and prevent spreading of the sills, a shaft supporting bar mounted upon the sills in front of the radiator, a transverse shaft carried by said bar, and means for driving said shaft from the tractor.

4. An attachment for self-propelled tractors comprising a pair of sills, means for detachably securing said sills against the sides of the tractor, a transverse shaft-carrying bar mounted slidably upon said sills, a transverse work shaft carried by said bar, means for operating said shaft from the tractor, an anchor bar secured transversely upon the sills in rear of said shaft-carrying bar, and adjusting bolts carried by one of said bars and bearing against the other bar.

5. The combination with a unitary type self-propelled tractor having a radiator at its front end, and a pulley on its side, of a pair of sills disposed at the sides of the tractor and resting on the lower flange of the radiator and projecting forwardly beyond the radiator, brackets carried by the rear ends of the sills to be secured to the tractor body, a transverse tie rod inserted through the sills immediately in advance of the radiator and clamping the sills to the sides of the radiator and also preventing spreading of the sills, a shaft-carrying bar mounted on the sills in front of the radiator, means for clamping said bar to the sills, a transverse shaft on said bar, means for actuating said shaft from the pulley on the side of the tractor, an anchor bar secured on the sills between the tie rod and the shaft-carrying bar, and means at both ends of the anchor bar for securing the shaft-carrying bar.

6. The combination with a self-propelled tractor having a transverse power shaft and a drive pulley thereon independent of the propulsion wheels, together with an engine adapted to drive either the wheels or shaft selectively, of a pair of spaced sills secured to the front part of the tractor one at each side thereof and projecting at least when the device is functioning, longitudinally at a higher level than said drive pulley, work-performing mechanism mounted on the projecting portion of said sills, said mechanism including a transverse shaft, a pulley on said shaft projecting outside of the corresponding sill and in the plane of said first pulley, and a belt connecting said pulleys and crossing the plane of said sills at an oblique angle.

7. The combination with a self-propelled tractor having a transverse power shaft and a drive pulley thereon independent of the propulsion wheels, of a pair of spaced sills, supporting means carried by the front part of said tractor and engaging said sills, other means engaging said sills at a distance from said first means and cooperating therewith to hold said sills substantially horizontal and with their plane above said drive pulley, at least when the device is functioning, a transverse shaft journaled on said sills in front of said tractor, a pulley on one end of said shaft outside of the adjacent sill and in the plane of said drive pulley, a rotatable, work performing device secured to the other end of said shaft outside of the other sill, and a belt connecting said pulleys and crossing the plane of said sills at an oblique angle.

8. The combination with a tractor having a transverse power shaft, of a pair of spaced parallel sills located upon opposite sides of the tractor body at a higher level than said shaft, means securing said sills to the engine base at one end, the opposite ends projecting beyond the tractor body, means supporting the middle portions of said sills relative to the tractor body, a horizontal transverse arbor carried by the projecting ends of said sills, pulleys carried by said shaft and arbor respectively outside of said sills, and a belt connecting said pulleys.

9. An attachment for self-propelled tractors comprising a pair of spaced parallel sills adapted to embrace the radiator, brackets at the rear ends of said sills adapted to be secured to the gear casing of the tractor, a tie bolt connecting said sills at a distance from said brackets for clamping said sills to the radiator, and work-performing mechanism carried by the part of said sills forward of said tie bolt, said mechanism including a pulley adapted to be belted to the power shaft of the tractor.

10. An attachment for self-propelled tractors comprising a pair of sills, means for securing the sills to opposite sides of the tractor radiator in embracing relation, a shaft-carrying bar mounted transversely upon said sills a shaft carried by said bar, means for operatively connecting said shaft with the work performing pulley of the tractor, an anchor bar secured upon the sills parallel to said first bar, and means carried by one of said bars for adjusting the shaft-carrying bar longitudinally of the sills.

11. The combination with a self-propelled tractor having propulsion wheels and a power shaft, and an engine adapted to drive either the wheels or shaft selectively, of an attachment comprising a pair of sills fixedly secured to opposite sides of the tractor in embracing relation, mechanism mounted upon said sills so as to be supported beyond the end of the tractor without impeding the propulsive action of said tractor, means independent of the propulsion wheels for driving said mechanism from the same engine which drives said wheels, and a workholder movably carried by said sills upon the opposite side of said mechanism from the tractor.

In testimony whereof I affix my signature.

OLIVER W. JOHNSON. [L. S.]